Oct. 20, 1925.
R. M. GALLOWAY ET AL
CYCLE CONTROL MECHANISM
Filed Aug. 14, 1923 2 Sheets-Sheet 2
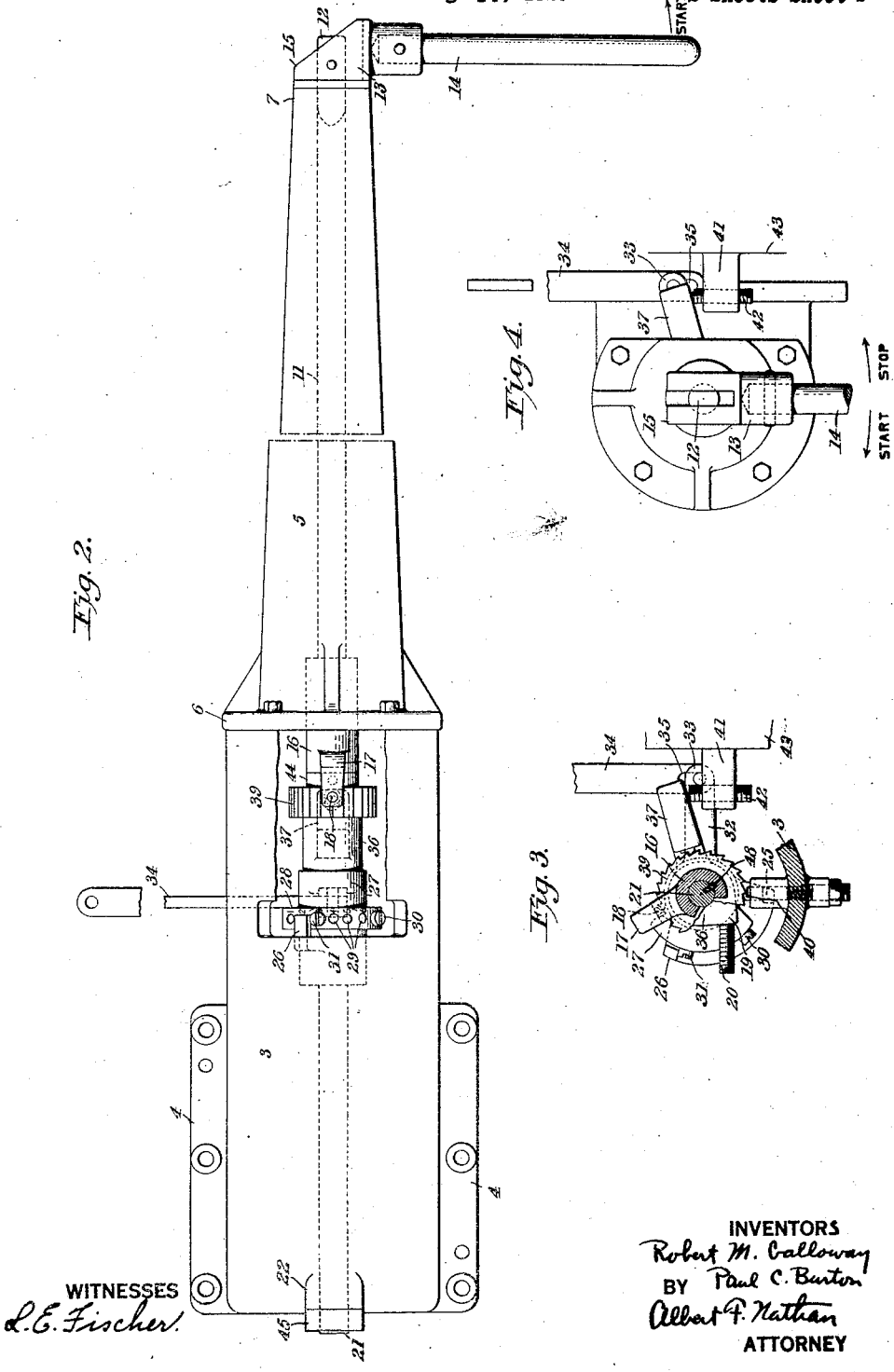
INVENTORS
Robert M. Galloway
BY Paul C. Burton
Albert F. Nathan
ATTORNEY
WITNESSES
L. E. Fischer Patented Oct. 20, 1925.

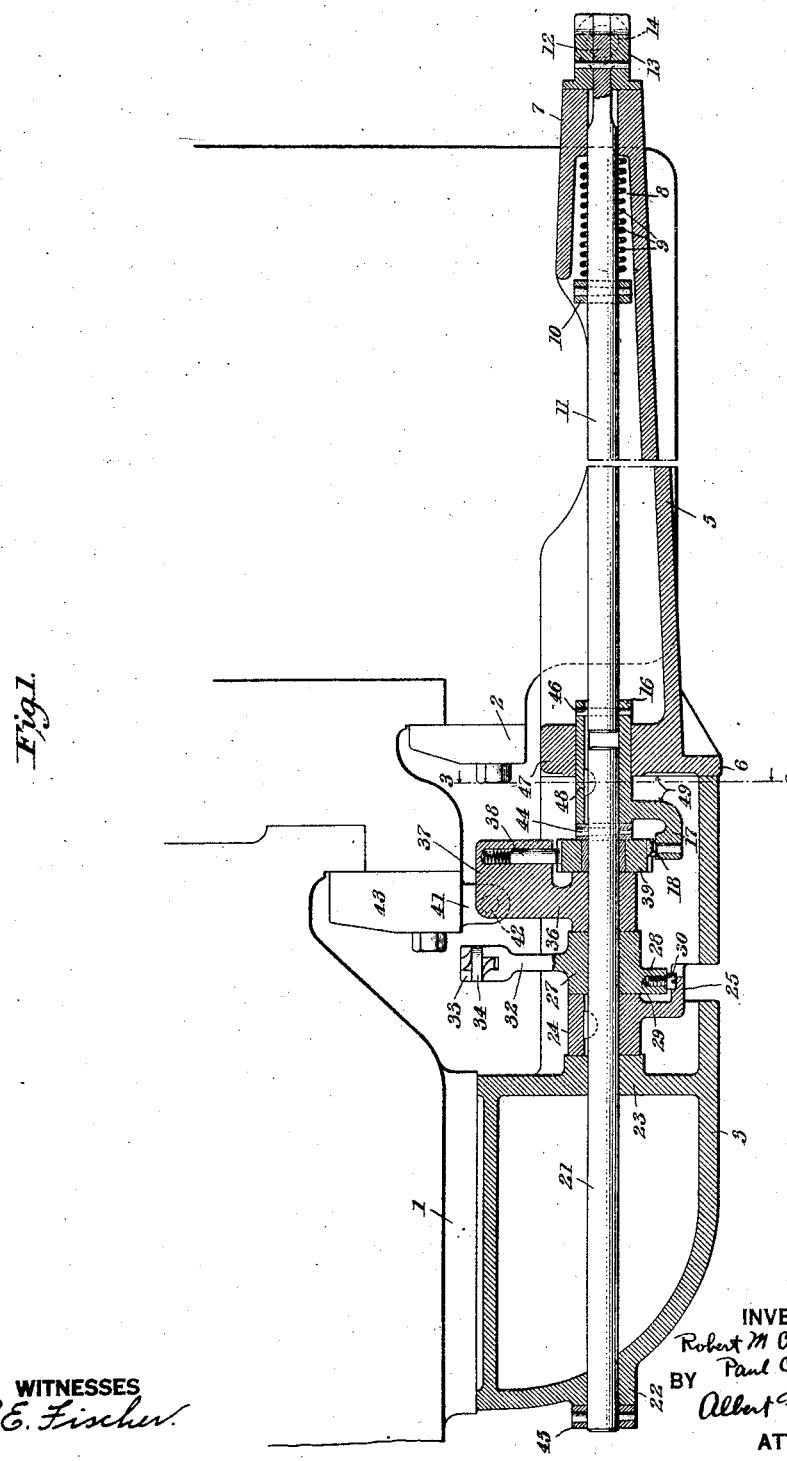

1,557,928

UNITED STATES PATENT OFFICE.

ROBERT M. GALLOWAY, OF RICHMOND, INDIANA, AND PAUL C. BURTON, OF CLARENDON HILLS, ILLINOIS, ASSIGNORS TO THE NATIONAL AUTOMATIC TOOL COMPANY, OF RICHMOND, INDIANA, A CORPORATION OF INDIANA.

CYCLE-CONTROL MECHANISM.

Application filed August 14, 1923. Serial No. 657,384.

*To all whom it may concern:*

Be it known that we, ROBERT M. GALLOWAY and PAUL C. BURTON, citizens of the United States and residing at Richmond, in the county of Wayne and State of Indiana, and Clarendon Hills; in the county of Du Page and State of Illinois, respectively, have invented a new and Improved Cycle-Control Mechanism, of which the following specification is a full disclosure.

This invention deals with means for mechanically controlling the operation of a mechanism devised to function through one or more cycles; the instrumentality constituting the invention being capable of automatically determining the number of cycles to be performed and being capable of being adjusted to ensure the performance of any predetermined number of cycles.

In certain classes of machines, as for example, in certain types of multiple-drill machines, it is desirable to have the tool or tools approach and recede from the work through a number of strokes following the one immediately upon the other and then to have this periodic operation cease until the attendant is prepared to have the series of cycles again repeated. In other words, it is desirable to have the machine perform a series of cycles automatically and to enable the attendant manually to inaugurate the performance of each series. This invention contemplates a mechanism adapted to satisfy that desideratum by placing at the use of the attendant an automatic control of such a nature that a simple manipulation of it by the attendant will cause it so to control and act upon the machinery which it dominates that the latter will function whatever number of times has been predetermined by the initial adjustment of the control mechanism.

It is, accordingly, a further object of this invention so to devise the control mechanism that it may be very easily subjected to an initial adjustment which will determine the number of the cycles and which thereupon may be repeatedly manipulated by an easily accomplished movement of a hand element to set the main mechanism in action and thereupon determine the number of cycles of its operation.

This invention furthermore aims to render available a control mechanism of the nature indicated which, in point of structure and organization, will be as simple as possible consistent with its automatic capabilities and which will be rugged, durable and not only accurate but likewise entirely reliable in serving its office. While the invention equally contemplates its embodiment as a built-in organization, it also has in objective a self-contained organization in the nature of a unit which may readily be affixed to a machine adapted for periodic action, as for example, to any machine in which a so-called "one-revolution" clutch is employed, or other periodic means, for initiating and terminating the action of the machine.

In a more intense aspect, this invention contemplates a multiple-drilling machine embodying a head adapted to approach and recede to intermittently bring the drills and the work together and in which a periodic clutch, such as a one-revolution clutch, functions to produce the aforesaid action, and also in which there is an automatic instrumentality for determining the number of times that said clutch will successively function before arresting the reciprocations of the head.

Other objects and advantages will be in part indicated in the following description and in part rendered apparent therefrom in connection with the annexed drawings.

To enable others skilled in the art so fully to apprehend the underlying features hereof that they may embody the same in the various ways contemplated by this invention, drawings depicting a preferred typical construction have been annexed as a part of this disclosure and, in such drawings, like characters of reference denote corresponding parts throughout all the views, of which:—

Fig. 1 is a longitudinal section of a control instrumentality constituting one embodiment of this invention. Fig. 2 is a side-elevation of the same; certain parts being broken away for purpose of clearness. Fig. 3 is a fragmentary section along line 3—3 of Fig. 1 showing the general relationship between the clutch controlling means and the automatic counter for controlling the latter, as well as other parts. Fig. 4 is an end-elevation looking towards the right-hand end of Fig. 2 and showing the position of the parts when the control mechanism has reached the end of the series of operations which it had been adjusted to perform; this being the stop position in which the parts are ready to be again set into operation by a movement of the hand-lever.

The annexed drawings are to be regarded as diagrammatic in so far as the machine to be controlled is concerned and they are likewise diagrammatic as to the periodic mechanism embodied by the main machine, to wit, the cam or crank for reciprocating the head, the source of power and the one-revolution clutch or other periodic agent utilized for connecting and disconnecting the source of power from the means for reciprocating the head. These parts are in and of themselves purely conventional elements and, apart from the control instrumentality, are well understood by those skilled in the art and hence need no illustration and description.

A fragment of the main frame of the machine is represented in Fig. 1 by 1 and this main frame provides suitable guideways 2 which constitute the path of reciprocations of a head which is diagrammatically represented by 43; this head being utilized to carry the work or the tool, as the case may be, and by its strokes to bring the work and tools together to perform the requisite tooling-operation; all as will be understood by those skilled in the art.

The control instrumentality to which this invention is directed, both from an isolated standpoint and in combination with a one-revolution clutch or equivalent means, is shown in general assembly by Fig. 1. In this embodiment, the control instrumentality is in the nature of a unit having flanges such as 4 whereby it may be secured to the main machine; the unit involving a suitable housing, such as the barrel indicated by 3, and the bracket 5 secured to the barrel by the flange 6 and serving as a mounting for the hand-shaft, as will be understood. In the form illustrated, the bracket 5 is shown elongated so that the hand-lever which is journaled at its forward end will be in a position on the main machine very convenient to the attendant who is observing the progress of the work; the other parts of the instrumentality being in line with the link which extends to the one-revolution clutch arranged in the main machine.

Before describing the instrumentality in detail, it may be pointed out that, by inserting the screw 31 into the first, second or third etc. of the holes in the segment 28 (see Fig. 2), the instrumentality is set for insuring a corresponding number of cycles in the main machine. To initiate the performance, the attendant will simply grasp the hand-lever 14 and pull it out (to the right of Fig. 2) and then swing it clockwise as far as it will go, and then release his grasp on said lever. The instrumentality will then start the main machine and cause the head to reciprocate through as many strokes as corresponds to the initial setting of the screw 31. The means whereby this operation results from the aforesaid simple manipulations, and the character of the mechanism, will now be described.

Pivotally mounted in a suitable manner, as for example, in coaxial relation with the shaft 21, is an element 27 having an arm 32 in the nature of an operating lever for controlling the one-revolution clutch which connects and disconnects the main or cyclic machine with the source of power. In this case, this is accomplished by means of a link 34 which, at its lower end, has a slightly elongated slot 35 receiving a pin secured to the extremity 33 of the lever 32. The slot 35 is for the purpose of enabling the arm 32 to move idly for a slight distance (i. e. have some "lost-motion") before throwing the clutch so as to cut down the throw as transmitted from the control mechanism to the clutch; although the parts could be arranged without this lost-motion. When the element 27 is turned anti-clockwise to elevate the link 34, the clutch in the main machine becomes disengaged and the driving of the machine is suspended but, when the element 27 is turned clockwise to lower the arm 32, the link 34 is depressed and the machine then is connected with its power and continues to operate as long as the link 34 is down.

To start the machine through its series of cycles, a hand-operated means is provided to enable the element 27 to be rotated clockwise. This means comprises a yoke-like member 24 which is secured to the shaft 21, and has two prongs 25 and 26 in the nature of abutments arranged preferably in the same circumferential path. Concentrically within the path of the abutments 25 and 26 is an arc-like segment 28 extending from the member 27 and the periphery of this segment is provided with a series of equi-spaced holes 29 threaded to receive screws or studs 30 and 31. These holes are numbered in succession and the stud 30 is preferably permanently mounted in the hole representing the highest number of cycles available in the particular machine; whereas the stud 31 is adapted to be inserted in any one of the remaining holes to determine the number of cycles to be performed, as will be explained subsequently. The purpose of the abutment 25 is to cooperate with the permanent stud 30 to swing the member 27 clockwise and operatively engage the one-revolution clutch in the main machine. When the member 24 is turned clockwise, the abutment 25 will ultimately hit the stud 30 and, if the motion be continued, the element 27 will be turned as explained and the means for turning the member 24 comprises a shaft 21 journaled in bearings 22 and 23 provided by the auxiliary frame 3. This shaft is restrained against axial movement by collars 45 and 44. The turning of the shaft 21 by hand is accomplished through a shaft 11 which is journaled at the extreme end 7 of the extension frame 5 and is secured by a pin 46 to a sleeve 16 journaled at 47 in the other end of the frame 5. This sleeve 16 is provided with an internal spline-way adapted slidably to receive a key 48 secured to the end of the shaft 21 which projects into the bore of the sleeve 16. The shaft 11, for purposes to be soon explained, is capable of being shifted longitudinally to a slight extent, i. e., to the extent of the clearance indicated by the space 49 and the splined connection between the shafts 11 and 21 permits this longitudinal shift without any change in the angular relationships between said shafts or the parts secured thereto. Consequently, the arm 17 extending from the sleeve 16 is always in the same angular relation with the abutments 25 and 26 and, when the shaft 11 is turned clockwise, the abutment 25 will be brought against the permanent stud 30 and turn the element 27 correspondingly. The shaft 11 may be partially rotated as explained by means of a hand-lever 14 which is pivotally connected to the extremity of said shaft 11. The extremity of said shaft is formed with a flat tongue 12 that enters the slot in the bifurcated portion of the yoke 13 and is pivoted thereto. Consequently, the shaft 11 will be rotated whenever the lever 14 is swung in the direction of the arrows shown on Fig. 4. Thus, when swung to the left, the member 24 will always be turned clockwise and the link 34 drawn down and the cyclic mechanism started. Likewise, whenever the hand-lever 14 is swung to the right, the link will be raised and the cyclic mechanism stopped; this raising being accomplished by virtue of the contact between the abutment 26 and either the adjustable stud 31 (if it be employed) or against the permanent stud 30 in the absence of the adjustable stud 31. Thus, the control instrumentality may be set, irrespective of all other considerations, at any time by hand either to hold the one-revolution clutch disengaged so that the cylic mechanism will not be driven, or to hold it engaged so that the cylic mechanism will start to operate and continue through either one or more cycles; depending upon the setting of the stud 31 or, in its absence, upon the stud 30.

The means for controlling the number of cycles comprises an escapement mechanism adapted to be periodically oscillated by the reciprocations of the head of the cyclic machine, or otherwise; the construction being such that the oscillations are transformed into an intermittent advance of the member 24 which ultimately moves the clutch controlling link into its stop position. Pivotally mounted to move independently of the shaft 21, is a part 36 in the nature of a counting element. This element has a radial extension 37 that projects into the upper extremity of the path of an abutment 42 (in the nature of a screw for purposes of adjustment) carried by a lug 41 projecting laterally from a portion of the head 43 of the main machine. Being at the uppermost extremity of the path of travel of the abutment 42, the part 37 will be moved only to a comparatively slight extent (a small fraction of the entire stroke) during the last portion of the uprise of the head 43, and this slight periodic movement is utilized for counting the number of strokes and for suspending the operation of the machine after the requisite number has been performed. Each time the head descends and the abutment 42 is no longer in position to lift the weighted part 37, the latter will fall by gravity through a slight arc, say about fifteen degrees and further movement will be arrested by a hump 19 formed on the part 36 and adapted to move into contact with an adjustment screw 20 appropriately mounted in the frame 3 of the control instrumentality.

The ratchet-wheel 39 is also loosely pivoted about the shaft 21 to move independently thereof and a pawl 38 is carried by the part 37 and is spring-pressed against the teeth of the ratchet-wheel 39 so that, when the part 37 is lifted, its pawl will positively move the ratchet through one tooth-space (about fifteen degrees) and will then return to its normal position as soon as the abutment 42 is withdrawn; the normal position being determined by the contact between the hump 19 and the screw 20. Any movement of the ratchet-wheel in an opposite direction during the descent of the part 37 is prevented by a pawl 40 which occupies a permanent position on the machine; being mounted in the frame 3 and held by a spring against the periphery of the ratchet wheel 39 at all times.

The ratchet wheel 39 is a mechanical intermediary communicating successive advances to the means for elevating the link 34 and disengaging the periodic clutch; acting through the lost motion feature to effect that operation only after a predetermined number of cycles have been completed. This means that all of the lost motion made available by the setting of the stud 31 must be initially provided in the connection so that the ratchet 39 will be required to take up all of that lost motion before disengaging the main clutch. To enable all of the lost motion available to be initially obtained, this invention contemplates means for disconnecting the shaft 11 from the ratchet 39 so that said shaft may be turned until all of the lost motion has been provided for and then re-engaged with the ratchet so that thereafter the ratchet and the shaft 11 will move as a unit without any variation in the relation therebetween. The structure for effecting this setting comprises an arm 17 extending from the sleeve 16; this arm projecting over the periphery of the ratchet 39 and being provided with a fixed pin 18 so constructed at its extremity as snugly to interfit with a tooth space of the ratchet 39. A sufficient space in the nature of a clearance indicated by 49, is provided between the arm 17 and the part 47 of the frame so that, when the shaft 11 is retracted longitudinally by swinging the hand-lever 14 and utilizing a portion 15 of the yoke 13 as a sliding fulcrum, the pin 18 may be laterally withdrawn entirely free from the ratchet wheel 39. It is now possible to turn the shaft 11 clockwise (the pin 18 being disengaged) until the abutment 25 has impacted the permanent stud 30 and moved it along its path until the clutch link 34 has been pulled down as far as it will go; thus starting the driving of the periodic machine. When now the attendant releases his grip on the hand-lever 14, the spring 9 in the recess 8 in the end of the frame 5 will, by pressing against the collar 10, move the shaft 11 longitudinally towards the ratchet wheel 39; thus causing the tooth 18 to enter the tooth space in the ratchet wheel which is in lateral registry with it at the time. In this manner, a positive relation is established between the parts 24, 39 and 17 so that they all move as a unit and, therefore, each time the part 37 is uplifted when the head of the main machine rises, it will move the aforesaid parts through an arc approximately fifteen degrees; to wit, through an arc represented by a single tooth-space of the ratchet wheel. In other words, one of the several units representing the total length of the lost motion space will be eliminated at each uprise of the head; it being understood that with each depression of the head, the weighted lever 37 carries the pawl 38 past a single tooth of the ratchet and effects its engagement within the next tooth space.

It will thus be seen that, by removing the screw stud 31, the instrumentality will cause seven cycles to take place and by putting the stud 31 into any one of the holes 29, a number of cycles corresponding to the number of the hole will be accomplished.

An important characteristic of this invention resides in that coordination of and between its various elements whereby, without in any manner conflicting with its normal usages and functions, at any moment and irrespective of the then positions of the elements, the mechanism may be brought to a motion-arresting status by the mere throw of a hand-lever. This is a valuable capacity inasmuch as, in the interest of safety or to prevent damage, it may become essential at any instant to suspend the action of the cyclic-machine at any time; instead of permitting it to continue to run through the several cycles remaining in the predetermined series. Likewise, this arrangement enables a user to cause the machine to start and finish (for temporary use) a single cycle or any number of cycles less than that for which it is set without altering the normal adjustment of the control instrumentality.

It will thus be seen that the objects of this invention are achieved in a simple and substantial manner by the structure herein described and by the principles underlying the characteristics of construction above noted. The instrumentality may, if desired, be built as a unit and separately affixed to any periodic organization which is to have a control exercised mechanically over its number of cycles; or the structure may be built in the machine to constitute a permanent sub-mechanism thereof. Inasmuch as the periodic clutch has been contemplated as a cooperating sub-mechanism in designing the herein-specified control instrumentality, this invention, from certain standpoints, includes the periodic clutch as an element of the general combination.

Without further analysis, the foregoing will so fully reveal the gist of this invention that others can, by applying current knowledge, readily adapt it for various utilizations by retaining one or more of the essential characteristics of either the generic or specific aspects of this invention, and, therefore, such adaptations should be, and are intended to be, comprehended within the meaning and range of equivalency of the following claims.

Having thus revealed this invention, I claim as new and desire to secure the following combinations and elements, or equivalents thereof, by Letters Patent of the United States:

1. A control instrumentality for cyclic mechanism combining an element connected with said cyclic mechanism and adapted in one position to cause said mechanism to function and in another position to suspend its operation; a shaft upon which said element is journaled; a member fixed to said shaft and having a lost-motion connection with said element; manual means to rotate said shaft and said member in one direction, to shift said element to its operative position; and automatic means actuated by said cyclic mechanism to periodically rotate said shaft in a reverse direction to return it to its initial position, the last of said periodic movements acting through said member, to shift said element to its inoperative position.

2. A control instrumentality for cyclic mechanism combining an element connected with said cyclic mechanism and adapted in one position to cause said mechanism to function and in another position to suspend its operation; a shaft upon which said element is journaled; a member fixed to said shaft and having a lost-motion connection with said element; manual means to rotate said shaft and said member in one direction, to shift said element to its operative position; automatic means actuated by said cyclic mechanism to periodically rotate said shaft in a reverse direction to return it to its initial position, the last of said periodic movements acting through said member to shift said element to its inoperative position; and manual means operative at will to render said automatic means ineffective and to shift said element to its inoperative position.

3. A control instrumentality for cyclic mechanism combining an element connected with said cyclic mechanism and adapted in one position to cause said mechanism to function and in another position to suspend its operation; a shaft upon which said element is journaled; a member fixed to said shaft and having an operative connection with said element; means to effect a predetermined setting of said element and said member to cause actuation of said cyclic mechanism; a ratchet loosely journaled on said shaft and adapted to be turned unidirectionally by said cyclic mechanism; and means to transmit the movement of said ratchet to said member and said element to discontinue the movement of said cyclic mechanism.

4. An automatic control for a cyclic mechanism, said control combining a connection with said cyclic mechanism adapted to connect and disconnect said cyclic mechanism with its source of motion; manually operable means for said connection, said means having a lost-motion relation with said connection; and a ratchet device adapted to be periodically moved by said cyclic mechanism to advance said means progressively to take up the lost-motion and move said connection into its motion-arresting position.

5. A control instrumentality for cyclic mechanism combining an element connected with said cyclic mechanism and adapted in one position to cause said mechanism to function and in another position to suspend its operation; fixed and adjustable abutments carried by said element; a member journaled coaxial with said element and having portions arranged in the path of said abutments and at the opposite sides thereof; manual means to shift said member first relative to said element to bring one of said portions into contact with said fixed abutment and to remove the other portion away from said adjustable abutment, and next, with said element to cause said cyclic mechanism to function; and automatic means to reverse the movement of said member first to bring said last named portion into contact with said adjustable abutment and then to move said member and element synchronously to suspend the operation of said cyclic mechanism.

6. A control instrumentality for cyclic mechanism combining an element connected with said cyclic mechanism and adapted in one position to cause said mechanism to function and in another position to suspend its action; a shaft upon which said element is journaled; a member secured to said shaft and having an operative connection with said element; a ratchet mechanism actuated by said cyclic mechanism and normally connected to rotate said shaft; means for disconnecting said ratchet mechanism from said shaft; means active during the disconnection of said ratchet to rotate said shaft to start the actuation of said cyclic mechanism; and means to re-connect said ratchet mechanism with said shaft.

7. A control instrumentality for cyclic mechanism, of which a part is adapted to be reciprocated, combining an element connected with said cyclic mechanism and adapted in one position to cause said mechanism to function and in another position to suspend its operation; a shaft upon which said element is carried; a lost motion connection between said element and said shaft whereby the shaft and element may be rotated first relatively and then synchronously; a ratchet mechanism carried by said shaft and actuated by the reciprocatory part of said cyclic mechanism; means to connect said ratchet mechanism with said shaft; and means to disconnect said ratchet mechanism from said shaft to permit the shaft to be turned independently of said shaft.

8. A control instrumentality for cyclic mechanism combining a pivoted element connected with said cyclic mechanism and adapted in one position to cause said mechanism to function and in another position to suspend its operation; a member journaled with its axis coincident with the axis of said element and having a lost-motion connection with said element; a uni-directional ratchet mechanism normally connected with and serving to rotate said element periodically in one direction to take up the lost motion and to render said element ineffective; means to disconnect said ratchet mechanism from said element; and means to rotate said member in the opposite direction to shift said element to its operative position.

9. A control instrumentality for cyclic mechanism combining a shaft; an element having a lost-motion connection with said shaft and adapted in one position to cause said mechanism to function and in another position to suspend its operation; power-driven ratchet mechanism carried by and adaptd to actuate said shaft in one direction to move said element to its inoperative position; a second shaft; operative connections between said second shaft and said first shaft and said ratchet mechanism; means to translate said shaft to render said ratchet mechanism ineffective; and means to rotate said second shaft and therewith said first shaft to shift said element from one of its positions to the other.

10. A control instrumentality for cyclic mechanism of which one part is stationary and another part is adapted to be reciprocated; a bracket carried by said stationary part; a shaft journaled in said bracket; an element carried by said shaft and connected with said cyclic mechanism and adapted in one position to cause said mechanism to function and in another position to suspend its operation; a ratchet mechanism carried by said shaft and adapted to be periodically actuated by said cyclic mechanism; and a lost-motion connection between said ratchet mechanism and said element to cause the former to shift the latter upon a predetermined number of actuations.

11. A control instrumentality combining a power control element; a manual opererable means for determining the position of said element; said means affording lost motion whereby it may move to a predetermined extent before causing said member to function operatively; a member having a to-and-fro motion; a part adapted to be progressively advanced by said member; and means for adjustably connecting said part to the aforesaid means to initially provide the full extent of predetermined lost motion between said first mentioned means and said element.

12. A control instrumentality combining a power control element; rotatably mounted means having a lost motion connection with said element; a part in the nature of an endless ratchet; a hand device adapted to disconnect said part from said means and to reconnect the same in a new relation; a member having a periodic motion; and a driving connection between said member and said part for delivering a uni-directional motion to said part from said member.

13. An automatic control for a cyclic mechanism, said control combining a connection with said cyclic mechanism adapted to connect and disconnect said cylic mehanism with its source of motion; means for manually operating said connection, said means comprising a rock-shaft having a lost-motion relation with said connection; a ratchet wheel coaxial with said rock-shaft and adapted to be periodically moved by said cyclic mechanism to advance said means progressively to take up the lost-motion and move said connection into its motion-arresting position.

14. A control instrumentality for a cyclic mechanism combining a vibratory part deriving periodic motion from said mechanism; a ratchet intermittently advanced by said part; means detachably locked to said ratchet; a connection between said means and the source of motion of said cyclic mechanism; and a lost-motion device embodying an adjustable stop adapted to determine the number of operations of said part requisite to effect a shifting of said connection into its motion-arresting position.

15. A control instrumentality for a cyclic mechanism combining a lever connected with the source of motion of said cyclic mechanism; a hand-operated device for shifting said lever; a segment providing an adjustable stud arranged between said lever and said device for determining the free-play therebetween; a part periodically deriving motion from said cycle mechanism; and an adjustable escapement between said part and said hand operated device for effecting a progressive movement of said device, whereby it may ultimately shift said lever and thereby suspend the periodic operations of said cyclic mechanism.

16. A control instrumentality combining a power-controlling element; a hand-operated mechanism for actuating said element; a member adapted to be periodically moved; an escapement mechanism intervening between said member and said hand operated mechanism for communicating motion from the former to the latter, said escapement being relatively adjustable with respect to said hand-operated mechanism to permit the relation between said member and said mechanism to be predetermined; and a lost-motion connection arranged to permit motion to be dervied from said member for a predetermined period before being utilized to operate said element.

17. A control instrumentality combining a rock-shaft; a ratchet-wheel coaxial therewith; a releasable detent for positively engaging said rock-shaft and ratchet-wheel; a vibratory escapement mechanism for imparting a uni-directional rotation to said ratchet-wheel; and a power-controlling member having its position determined by said rock-shaft.

18. A control instrumentality combining a power-controlling lever, a hand-operated rock-shaft for actuating said lever; there being a lost-motion connection between said rock-shaft and said lever to permit motion to exist for a predetermined period before being utilized to operate said element; a vibratory member adapted to be periodically moved; and an escapement intervening between said member and said rock-shaft for communicating motion, said escapement being relatively adjustable to permit the relation between said parts to be predetermined.

19. A control instrumentality combining a manually-movable rock-shaft; a ratchet-wheel coaxial therewith; a releasable detent for positively engaging said rock-shaft and ratchet-wheel; a power-driven vibratory escapement-mechanism for imparting a uni-directional rotation to said ratchet-wheel; a power-controlling member having its position determined by said rock-shaft; and an adjustable lost-motion connection between said rock-shaft and said member.

In witness whereof, we hereunto subscribed our names.

ROBERT M. GALLOWAY.
PAUL C. BURTON.